US011185807B1

(12) United States Patent
Mazzella et al.

(10) Patent No.: US 11,185,807 B1
(45) Date of Patent: Nov. 30, 2021

(54) AIR FILTRATION SYSTEM FOR A BOX FAN

(71) Applicants: Michael Mazzella, Litchfield Park, AZ (US); Anthony Mazzella, Litchfield Park, AZ (US)

(72) Inventors: Michael Mazzella, Litchfield Park, AZ (US); Anthony Mazzella, Litchfield Park, AZ (US)

( * ) Notice: Subject to any disclaimer, the term of this patent is extended or adjusted under 35 U.S.C. 154(b) by 279 days.

(21) Appl. No.: 16/411,254

(22) Filed: May 14, 2019

(51) Int. Cl.
*B01D 46/00* (2006.01)
*B01D 46/10* (2006.01)
*B01D 46/42* (2006.01)
*F04D 25/08* (2006.01)
*F04D 29/52* (2006.01)
*F04D 25/06* (2006.01)

(52) U.S. Cl.
CPC ..... *B01D 46/0005* (2013.01); *B01D 46/0023* (2013.01); *B01D 46/10* (2013.01); *B01D 46/4227* (2013.01); *F04D 25/0606* (2013.01); *F04D 25/08* (2013.01); *F04D 29/522* (2013.01); *B01D 2265/02* (2013.01); *B01D 2279/40* (2013.01)

(58) Field of Classification Search
CPC .... B01D 46/00; B01D 46/422; B01D 46/523; B01D 46/0024; B01D 46/0045; B01D 2267/30; B01D 46/0005; B01D 46/10; B01D 46/4227; B01D 46/0023
USPC ...... 55/385.1, 471, 481, 506, 480, 490, 491, 55/493, 501, 511, DIG. 31; 415/121.2; 416/247 R; 248/224.7
See application file for complete search history.

(56) References Cited

U.S. PATENT DOCUMENTS

| 2,883,790 | A | * | 4/1959 | Blackman | A01M 1/08 43/113 |
|---|---|---|---|---|---|
| 4,898,516 | A | * | 2/1990 | Hendricks | F04D 29/703 416/247 R |
| 5,368,262 | A | * | 11/1994 | Garrity | F04D 29/601 211/162 |
| 6,264,727 | B1 | | 7/2001 | Elmore | |
| 6,527,838 | B2 | | 3/2003 | Volo | |
| 7,393,272 | B2 | * | 7/2008 | Sundet | F24F 1/0071 454/275 |
| 8,801,824 | B2 | * | 8/2014 | Whittemore | F04D 29/646 55/471 |
| 8,979,965 | B2 | | 3/2015 | Minaeeghainipour | |
| D738,998 | S | | 9/2015 | Laver | |
| D777,901 | S | | 1/2017 | Whittemore | |
| 9,784,287 | B2 | * | 10/2017 | Whittemore | F04D 29/646 |
| 2002/0007735 | A1 | * | 1/2002 | Volo | B01D 46/0005 96/134 |

(Continued)

FOREIGN PATENT DOCUMENTS

WO 2006071503 7/2006

*Primary Examiner* — Minh Chau T Pham

(57) ABSTRACT

The air filtration system for a box fan is a frame that couples to a box fan and holds an air filter adjacent to the box fan such that air drawn into the box fan must pass through the air filter. The front of the frame includes a fan mount that retains the fan in the frame using a press-fit. The rear of the frame comprises a filter mount that holds an air filter in the path of air flowing through the fan. The filter mount includes a top door that retains the filter and allow access to install and remove filters. In some embodiments, the air filtration system for a box fan may include a second fan mount to hold a second air filter.

15 Claims, 4 Drawing Sheets

(56) References Cited

U.S. PATENT DOCUMENTS

| | | | |
|---|---|---|---|
| 2006/0168925 A1* | 8/2006 | Whittemore | B01D 46/0012 |
| | | | 55/490 |
| 2008/0019823 A1 | 1/2008 | Mirabal | |
| 2013/0340400 A1* | 12/2013 | Minaeeghainipour | ........................ |
| | | | B01D 46/0002 |
| | | | 55/511 |
| 2017/0151527 A1* | 6/2017 | Crum | B01D 46/0024 |

* cited by examiner

AIR FILTRATION SYSTEM FOR A BOX FAN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of ventilation, more specifically, an air filtration system for a box fan.

SUMMARY OF INVENTION

The air filtration system for a box fan is a frame that couples to a box fan and holds an air filter adjacent to the box fan such that air drawn into the box fan must pass through the air filter. The front of the frame comprises a fan mount that retains the fan in the frame using a press-fit. The rear of the frame comprises a filter mount that holds an air filter in the path of air flowing through the fan. The filter mount comprises a top door that retains the filter and allow access to install and remove filters. In some embodiments, the air filtration system for a box fan may comprise a second fan mount to hold a second air filter.

An object of the invention is to filter the air flowing through a box fan.

Another object of the invention is to retain an air filter adjacent to the intake of a box fan.

A further object of the invention is to provide a door for accessing the air filter for installation and removal of the air filter.

Yet another object of the invention is to couple the frame of the invention to the box fan such that the frame does not interfere with the operation of handles and speed controls on the box fan.

These together with additional objects, features and advantages of the air filtration system for a box fan will be readily apparent to those of ordinary skill in the art upon reading the following detailed description of the presently preferred, but nonetheless illustrative, embodiments when taken in conjunction with the accompanying drawings.

In this respect, before explaining the current embodiments of the air filtration system for a box fan in detail, it is to be understood that the air filtration system for a box fan is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the air filtration system for a box fan.

It is therefore important that the claims be regarded as including such equivalent construction insofar as they do not depart from the spirit and scope of the air filtration system for a box fan. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
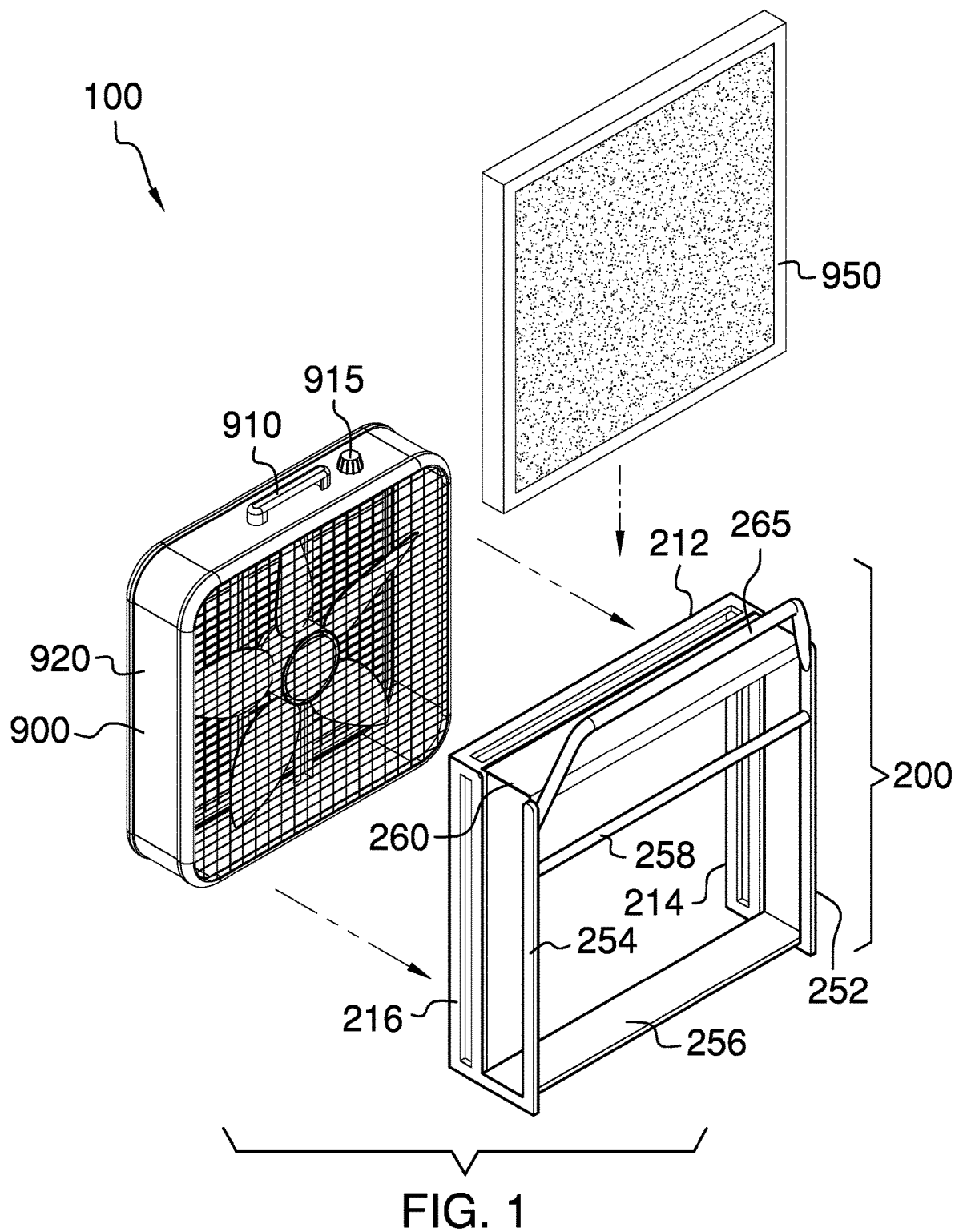
FIG. 1 is an exploded perspective view of an embodiment of the disclosure.
Figure 2:
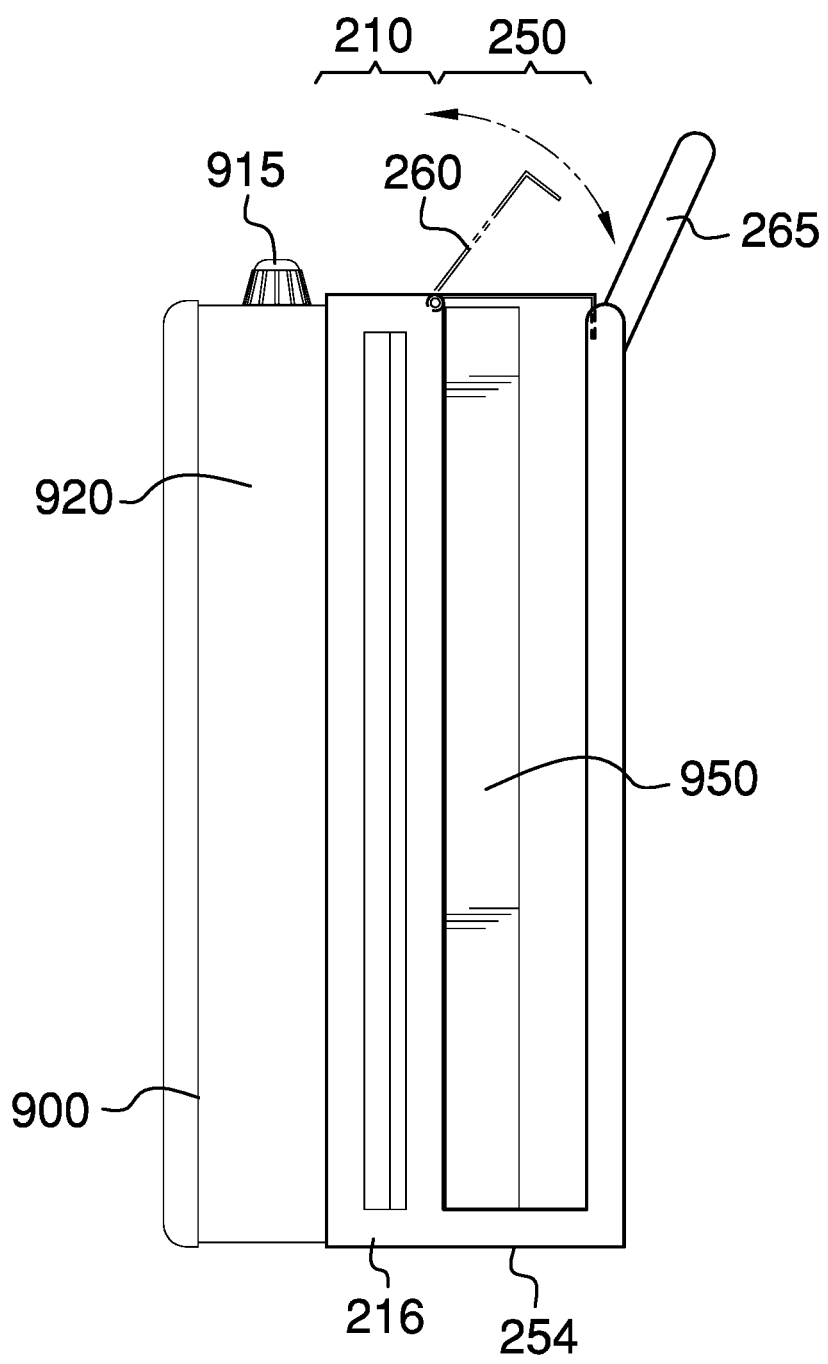
FIG. 2 is a side view of an embodiment of the disclosure.
Figure 3:
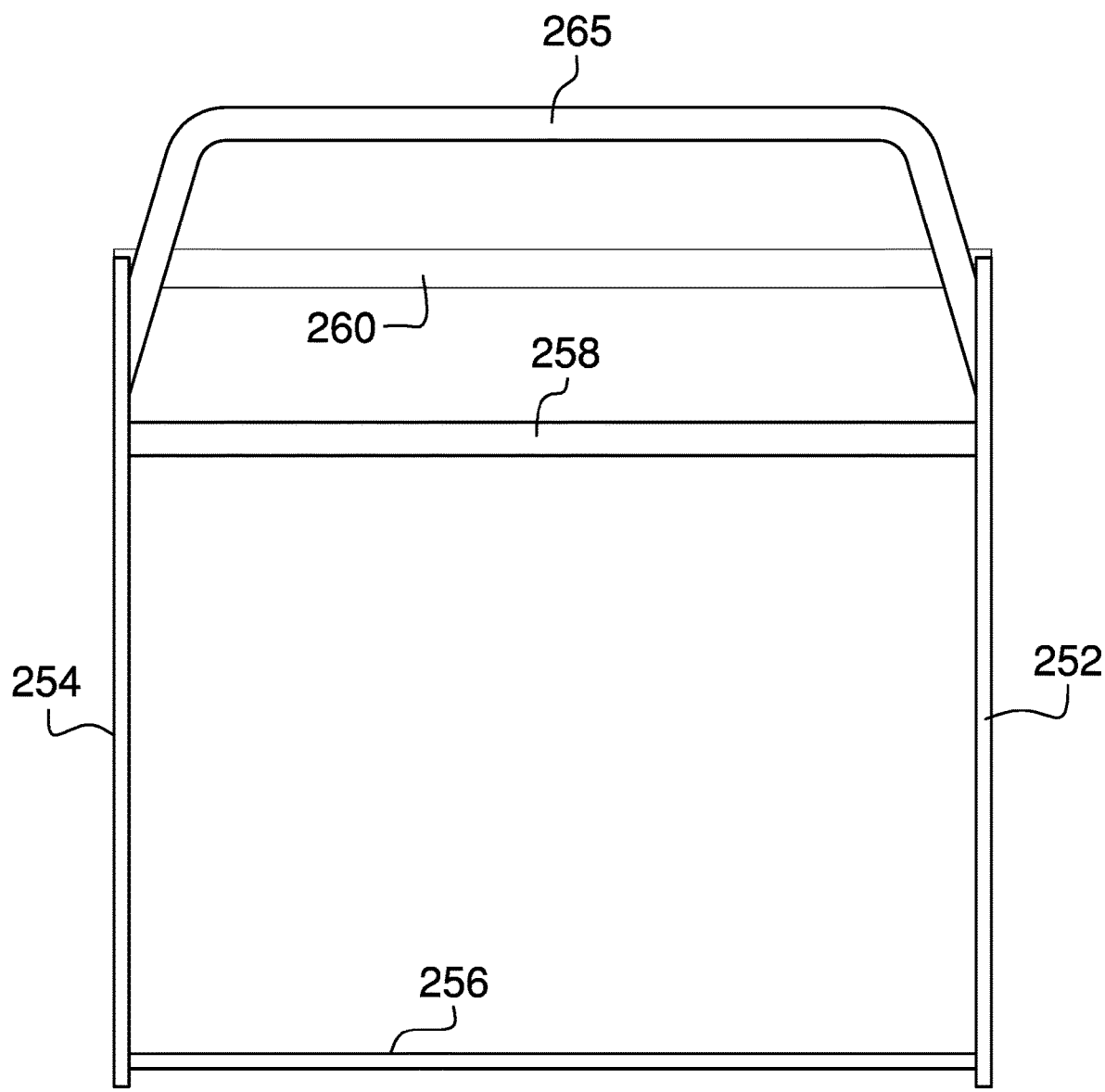
FIG. 3 is a rear view of an embodiment of the disclosure.
Figure 4:
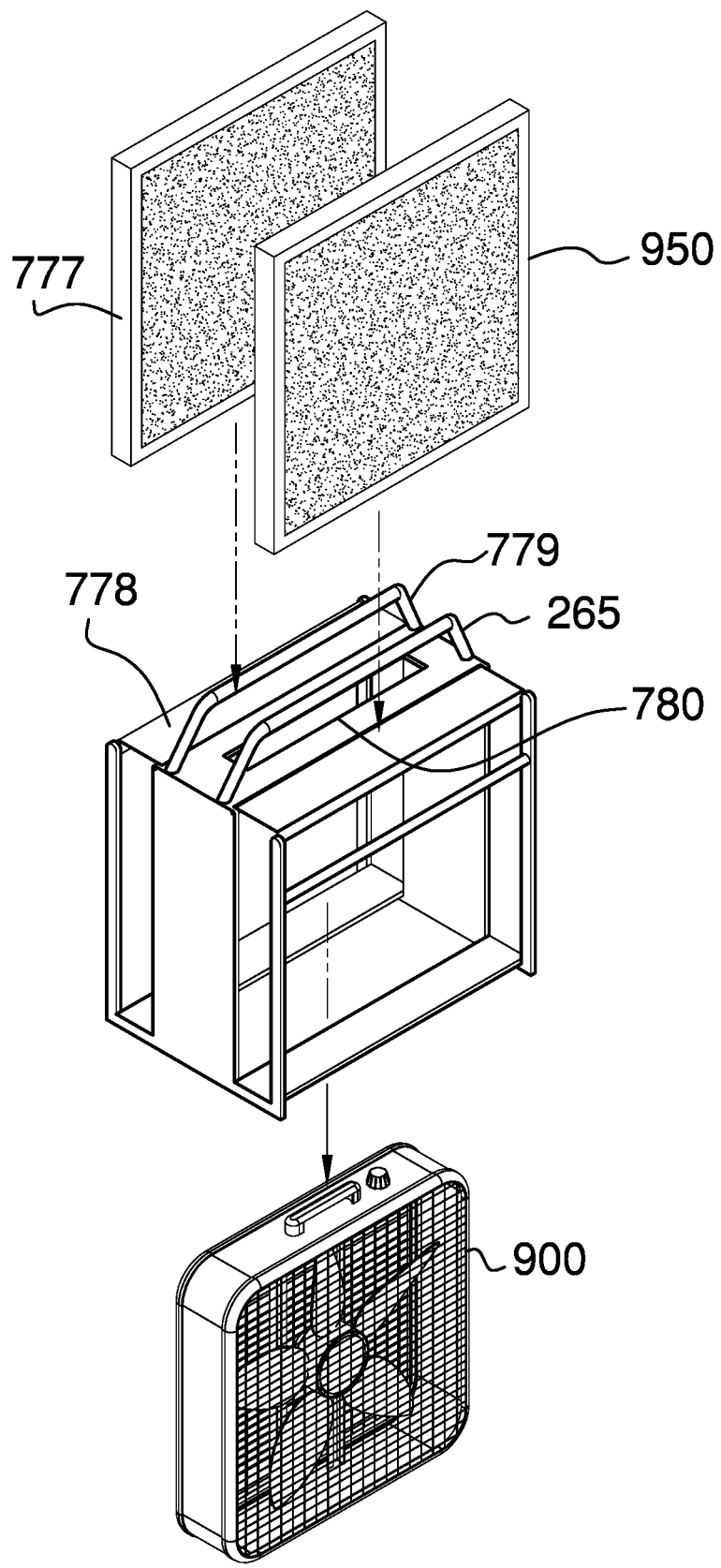
FIG. 4 is an exploded view of an alternative embodiment of the disclosure illustrating the use of two filter mounts and two air filters.

Detailed reference will now be made to a first potential embodiment of the disclosure, which is illustrated in FIGS. 1 through 4.

The air filtration system for a box fan 100 (hereinafter invention) comprises a frame 200 that couples to a box fan 900 and holds a first air filter 950 adjacent to the box fan 900 such that air drawn into the box fan 900 must pass through the first air filter 950.

The front side of the frame 200 may couple to the box fan 900 via a fan mount 210. The rear side of the frame 200 may retain the first air filter 950 within a first filter mount 250.

The fan mount 210 comprises a fan mount top 212, a fan mount left side 214, and a fan mount right side 216. The fan mount top 212 may be a rectangular panel. The fan mount top 212 may be horizontally oriented. The left side of the fan mount top 212 may couple to the top of the fan mount left side 214. The right side of the fan mount top 212 may couple to the top of the fan mount right side 216. The rear edge of the fan mount top 212 may hingedly couple to a filter mount door 260.

The fan mount left side 214 may be a rectangular panel. The fan mount left side 214 may be vertically oriented. The bottom of the fan mount left side 214 may rest on the floor.

The fan mount right side 216 may be a rectangular panel. The fan mount right side 216 may be vertically oriented. The bottom of the fan mount right side 216 may rest on the floor.

The fan mount left side 214 may be parallel to the fan mount right side 216. The horizontal distance between the inside surface of the fan mount left side 214 and the inside surface of the fan mount right side 216 may match the lateral width of the box fan 900. The vertical distance between the bottom surface of the fan mount top 212 and the floor may match the height of the box fan 900 as measured from the floor to the top of a fan shroud 920.

The box fan 900 may couple to the fan mount 210 by sliding the box fan 900 into the opening defined by the fan mount left side 214, the fan mount top 212, and the fan mount right side 216. Alternatively, the frame 200 may be lowered onto the box fan 900. The box fan 900 may be held in place by a press-fit between the box fan 900 and the fan mount 210. The front-to-rear width of the fan mount left side 214, the fan mount top 212, and the fan mount right side 216 may be less than ½ of the front-to-rear width of the box fan 900 such that features of the box fan 900 that are centrally located in a front-to-rear direction do not prevent the box fan 900 from sliding into the fan mount 210. As non-limiting examples, features of the box fan 900 may include a fan handle 910 or a fan speed control 915.

The fan mount left side 214, the fan mount top 212, and the fan mount right side 216 may form a square arch which air may flow through. The bottom of the fan mount 210 may be left open such that plurality of feet on the bottom of the box fan 900 may touch the floor.

The first filter mount 250 comprises a filter mount left side 252, a filter mount right side 254, a filter mount bottom 256, a filter mount cross brace 258, and the filter mount door 260. The filter mount left side 252 may be an L-shaped panel. The filter mount left side 252 may lie in a vertically oriented plane. The bottom of the filter mount left side 252 may project in a horizontal direction towards the front of the invention 100 and may couple to the bottom of the fan mount left side 214. The bottom of the filter mount left side 252 may rest on the floor.

The filter mount right side 254 may be an L-shaped panel. The filter mount right side 254 may lie in a vertically oriented plane. The bottom of the filter mount right side 254 may project in a horizontal direction towards the front of the invention 100 and may couple to the bottom of the fan mount right side 216. The bottom of the filter mount right side 254 may rest on the floor.

The filter mount bottom 256 may be a support for the bottom of the first air filter 950. The filter mount bottom 256 may be a rectangular panel. The filter mount bottom 256 may be horizontally oriented. The left edge of the filter mount bottom 256 may couple to the filter mount left side 252 at the top of the horizontal extension of the filter mount left side 252. The right edge of the filter mount bottom 256 may couple to the filter mount right side 254 at the top of the horizontal extension of the filter mount right side 254.

The filter mount cross brace 258 may be an armature that is oriented horizontally at the upper rear of the first filter mount 250. The left end of the filter mount cross brace 258 may couple to the upper ⅓ of the filter mount left side 252. The right end of the filter mount cross brace 258 may couple to the upper ⅓ of the filter mount right side 254.

The filter mount door 260 may be a panel that is hingedly coupled to the upper rear edge of the fan mount top 212. The lateral width of the filter mount door 260 may match the lateral width of the first filter mount 250. The front-to-rear width of the filter mount door 260 may match the front-to-rear width of the filter mount bottom 256. The vertical distance between the bottom surface of the filter mount door 260 and the top surface of the filter mount bottom 256 may match the height of the first air filter 950. The first air filter 950 may be installed in the invention 100 by opening the filter mount door 260, lowering the first air filter 950 into the space between the fan mount 210 and the filter mount cross brace 258, and closing the filter mount door 260.

In some embodiments, the invention 100 may comprise a first handle 265 located on the top of the frame 200 above the first filter mount 250. The first handle 265 may be an armature used to grasp the invention 100 for lifting or other movement. One end of the first handle 265 may couple to the left side of the frame 200. The other end of the first handle 265 may couple to the right side of the frame 200.

In some embodiments, the invention 100 may include a second air filter 777 within a second filter mount 778 on the front side of the frame 200. The fan mount top 212, the fan mount left side 214, and the fan mount right side 216 may be wider in a front-to-rear direction that the box fan 900 such that the frame 200 may be lowered onto the box fan 900. The fan mount top 212 may comprise a central slot 780 such that features of the box fan 900 may be accessible through the fan mount top 212.

In some embodiments, the invention 100 may include a second handle 779 located on the top of the frame 200 above the second filter mount 778.

In use, the box fan 900 may be placed into the fan mount 210 at the front of the invention 100 by placing the box fan 900 in front of the fan mount 210 and pushing the box fan 900 into the opening defined by the fan mount left side 214, the fan mount top 212, and the fan mount right side 216. Alternatively, the frame 200 may be lowered onto the box fan 900. The first air filter 950 may be placed into the first filter mount 250 by pivoting the filter mount door 260 open, lowering the first air filter 950 into the first filter mount 250, and pivoting the filter mount door 260 closed. The box fan 900 may be operating by plugging the box fan 900 in and turning it on. The box fan 900 may draw air through the first air filter 950 and may expel the air at the front of the box fan 900. As the air passes through the first air filter 950, particulates may be removed from the air by the first air filter 950. Both the box fan 900 and the first air filter 950 should be oriented with the expectation that air will flow from the rear to the front.

In embodiments comprising two filter mounts, the frame 200 may be lowered onto the box fan 900 and an air filter may be placed into both the first filter mount 250 and the second filter mount 778 as described above.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, a "brace" is a structural element that is used to support or otherwise steady an object.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used in this disclosure, a "fan" is a mechanical device with rotating blades that is used to create a flow or current of air.

As used herein, "filter" may refer to porous material that removes impurities from a fluid. As non-limiting examples, the fluid may be a liquid such as water, oil, or gasoline or a gas such as air. A filter may be encased in a housing which confines the flow of the fluid while forcing it to pass through the porous material.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "handle" is an object by which a tool, object, or door is held or manipulated with the hand.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "lateral" refers to the sides of an object or movement towards a side. Lateral directions are generally perpendicular to longitudinal directions. "Laterally" refers to movement in a lateral direction.

As used herein, the word "match" applied to dimensions or sizes indicates a correlation between the size of a first object and a size of a second object. The correlation does not necessarily imply that the objects are equal size. The correlation indicates that if the first object is made larger, then the second object must be made proportionally larger. Matching sizes may exclude overhangs, lips, edgings, trims, borders, mounts, or other features that enlarge the size of one or both objects but are unrelated to the intrinsic sizes of the objects.

As used in this disclosure, "vertical" refers to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An air filtration system for a box fan comprising:
a frame, and a box fan;
wherein the frame couples to the box fan and holds a first air filter adjacent to the box fan such that air drawn into the box fan must pass through the first air filter either before or after said box fan;
wherein a front side of the frame couples to the box fan via a fan mount;
wherein the box fan couples to the fan mount by sliding the box fan into the opening defined by a fan mount left side, a fan mount top, and a fan mount right side or by lowering the frame onto the box fan;
wherein the box fan is held in place by a press-fit between the box fan and the fan mount;
wherein a rear side of the frame retains the first air filter within a first filter mount;
wherein the fan mount comprises the fan mount top, the fan mount left side, and the fan mount right side;
wherein the fan mount top is a rectangular panel;
wherein the fan mount top is horizontally oriented;
wherein the left side of the fan mount top couples to the top of the fan mount left side;
wherein the right side of the fan mount top couples to the top of the fan mount right side;
wherein a rear edge of the fan mount top hingedly couples to a filter mount door.

2. The air filtration system for a box fan according to claim 1
wherein the fan mount left side is a rectangular panel;
wherein the fan mount left side is vertically oriented;
wherein a bottom of the fan mount left side rests on a floor.

3. The air filtration system for a box fan according to claim 2
wherein the fan mount right side is a rectangular panel;
wherein the fan mount right side is vertically oriented;
wherein a bottom of the fan mount right side rests on the floor.

4. The air filtration system for a box fan according to claim 3
wherein the fan mount left side is parallel to the fan mount right side;
wherein a horizontal distance between an inside surface of the fan mount left side and an inside surface of the fan mount right side matches a lateral width of the box fan.

5. The air filtration system for a box fan according to claim 4
wherein a vertical distance between a bottom surface of the fan mount top and the floor matches a height of the box fan as measured from the floor to a top of a fan shroud.

6. The air filtration system for a box fan according to claim 5
wherein a front-to-rear width of the fan mount left side, the fan mount top, and the fan mount right side are less than ½ of a front-to-rear width of the box fan such that features of the box fan that are centrally located in a front-to-rear direction do not prevent the box fan from sliding into the fan mount.

7. The air filtration system for a box fan according to claim 6
wherein the fan mount left side, the fan mount top, and the fan mount right side form a square arch which air flows through;

wherein the a bottom of the fan mount is open such that plurality of feet on a bottom of the box fan touch the floor.

8. The air filtration system for a box fan according to claim 5
wherein the first filter mount comprises a filter mount left side, a filter mount right side, a filter mount bottom, a filter mount cross brace, and the filter mount door;
wherein the filter mount left side is an L-shaped panel;
wherein the filter mount left side lies in a vertically oriented plane;
wherein a bottom of the filter mount left side projects in a horizontal direction towards a front of the air filtration system for a box fan and couples to the bottom of the fan mount left side;
wherein the bottom of the filter mount left side rests on the floor.

9. The air filtration system for a box fan according to claim 8
wherein the filter mount right side is an L-shaped panel;
wherein the filter mount right side lies in a vertically oriented plane;
wherein a bottom of the filter mount right side projects in a horizontal direction towards the front of the air filtration system for a box fan and couples to the bottom of the fan mount right side;
wherein the bottom of the filter mount right side rests on the floor.

10. The air filtration system for a box fan according to claim 9
wherein the filter mount bottom is a support for t a bottom of the first air filter;
wherein the filter mount bottom is a rectangular panel;
wherein the filter mount bottom is horizontally oriented;
wherein a left edge of the filter mount bottom couples to the filter mount left side at a top of a horizontal extension of the filter mount left side;
wherein a right edge of the filter mount bottom couples to the filter mount right side at a top of a horizontal extension of the filter mount right side.

11. The air filtration system for a box fan according to claim 10
wherein the filter mount cross brace is an armature that is oriented horizontally at an upper rear of the first filter mount;
wherein a left end of the filter mount cross brace couples to the upper ⅓ of the filter mount left side;
wherein a right end of the filter mount cross brace couples to the upper ⅓ of the filter mount right side.

12. The air filtration system for a box fan according to claim 11
wherein the filter mount door is a panel that is hingedly coupled to an upper rear edge of the fan mount top;
wherein a lateral width of the filter mount door matches a lateral width of the first filter mount;
wherein a front-to-rear width of the filter mount door matches a front-to-rear width of the filter mount bottom;
wherein a vertical distance between t a bottom surface of the filter mount door and a top surface of the filter mount bottom matches a height of the first air filter.

13. The air filtration system for a box fan according to claim 12
wherein the first air filter is installed in the air filtration system for a box fan by opening the filter mount door, lowering the first air filter into a space between the fan mount and the filter mount cross brace, and closing the filter mount door;
wherein the front side of the frame retains a second air filter within a second filter mount;
wherein the fan mount top, the fan mount left side, and the fan mount right side are wider in a front-to-rear direction that the box fan such that the frame lowers onto the box fan;
wherein the fan mount top comprises a central slot such that features of the box fan are accessible through the fan mount top.

14. The air filtration system for a box fan according to claim 13
wherein the air filtration system for a box fan comprises a first handle located on a top of the frame above the first filter mount;
wherein the first handle is an armature used to grasp the air filtration system for a box fan for lifting or other movement;
wherein one end of the first handle couples to a left side of the frame;
wherein an other end of the first handle couples to a right side of the frame.

15. The air filtration system for a box fan according to claim 14 wherein the air filtration system for a box fan comprises a second handle located on a top of the frame above the second filter mount.

* * * * *